June 27, 1967 G. K. TOLNAI 3,327,958

CONSTANT TENSION TAPE TRANSPORT SYSTEM

Filed Dec. 10, 1964

INVENTOR.
GABOR KORNEL TOLNAI
BY
Woodhams, Blanchard & Flynn
ATTORNEYS

United States Patent Office 3,327,958

Patented June 27, 1967

3,327,958
CONSTANT TENSION TAPE TRANSPORT SYSTEM

Gabor Kornel Tolnai, 14 Asbjornsens Vag, Bromma, Sweden

Filed Dec. 10, 1964, Ser. No. 417,406
Claims priority, application Sweden, May 25, 1964, 6,316/64
2 Claims. (Cl. 242—55.14)

In apparatus for signal reproduction having tapelike recording carriers it is often a great problem to keep the tension of the tape at a constant value on both sides of the device while feeding or supplying the tape at a constant speed. Since such a supply device generally comprises a drive shaft (drive capstan) and a pressure roller for pressing the tape against the capstan, it is desirable, in order to prevent the tape from slipping at the supply device, for the braking force of the tape supply reel and the traction of the take-up reel to be kept at an equilibrium when operating the apparatus. Such ideal condition cannot be maintained in practice without extensive control means for the motors driving the tape supply and take-up reels.

The present invention has for its object to solve the problem in a simple and effective manner and to achieve a constant tape tension totally independent of the tape diameters of the two tape reels, respectively.

An arrangement according to the present invention is mainly characterized in that each tape reel is coupled to a differential gear arranged in such a manner that to each reel it imparts a torque of such a direction that the tape portion between the tape reels is stretched.

Figure 1:
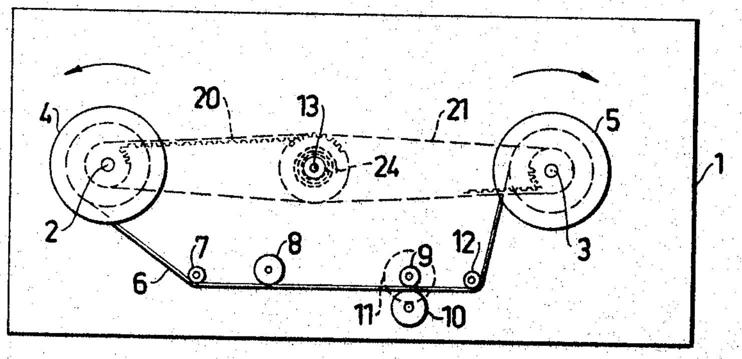
Figure 2:
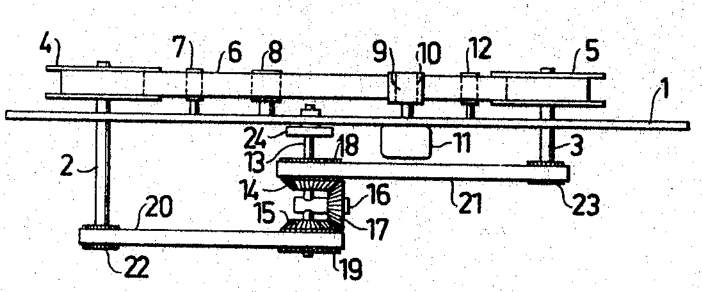

The invention will be described in detail hereinafter with reference to the accompanying drawing, in which:

FIG. 1 illustrates a tape recorder for magnetic signal reproduction as seen from the top, and FIG. 2 is a lateral view of an arrangement according to the invention as applied to the apparatus shown in FIG. 1.

The apparatus shown comprises a base plate 1, supporting two shafts 2, 3. The said shafts carry tape reels 4 and 5, respectively, onto which a tape 6 is wound. The free portion of the tape between the two reels runs from the supply reel 4 over a guide roller 7, a reproduction or playback head 8, to a capstan 9 with its cooperating pressure roller 10. The capstan is connected to a drive motor 11 attached beneath the base plate 1. Moreover, the tape is arranged to run over an additional guide roller 12 before being taken up by the tape reel 5. In the centre of the base plate 1 is mounted a shaft 13 supporting a differential gear means comprising two sun wheels idling on the shaft and having the shape of bevel gears 14, 15, and a planetary gear 17 supported by a pivot 16 and cooperating with the two said gears. The pivot 16 extends perpendicularly out from the shaft 13. Each of the gears 14 and 15 is rigidly attached to a toothed wheel 18 and 19, respectively, to cooperate with gear belts 20 and 21, respectively, running over additional toothed wheels 22, 23, which are located on the free ends of the tape reel shafts 2 and 3, respectively. A helical spring 24 is mounted concentrically about the shaft 13 supporting the differential gear, the inner end of the spring being attached to the shaft 13 and its outer end to the base plate.

The arrangement works in the following manner, assuming that the helical spring is prestressed to a suitable value, and that the tape is loaded in the manner illustrated in FIG. 1. In this case the shaft 13 will by the effect of the spring force tend to rotate, the planetary gear 17 acting on the sun wheels 14, 15, which via the toothed wheels 18, 19, the gear belts 20, 21, the toothed wheels 22, 23 on the shafts 2, 3 act on the tape reels

4 and 5, respectively, which results in stretching the free portion of the tape 6 between the tape reels 4 and 5. In case the pressure roller 10 is pushed to bear on the capstan 9, the tape will be entrained, it being assumed that the transport direction runs from the left to the right. The tape 6 is then supplied by the tape reel 4, the shaft 2 rotating. By the toothed wheel 22 and the gear belt 20 the drive is transferred from the tape supply to the toothed wheel 19 and the differential sun wheel 15 and via the planetary gear 17 to the sun wheel 14, and further via the toothed wheel 18, the gear belt 21, the toothed wheel 23 and the shaft 3 to the tape reel 5, which will thus tape up the tape transported. In case there is an equal amount of tape wound onto the two tape reels, i.e. so that the diameters of the two tape reels are equal, the shaft 13 will not rotate, i.e. the sun wheels 14, 15 will rotate at the same speed in opposite directions. At the same moment as the diameter of the reel 5 increases, the diameter of the reel 4 decreases, but the increase and decrease do not occur in a linear way, thus causing a certain difference in speed of the sun wheels 14, 15, which will then be taken up by the planetary gear 17 and bring the shaft 13 to rotate in proportion to the difference in speed. This rotation causes a tighter or looser tension of the spring 24 depending on the difference in diameters of the tape reels and their mutual winding relation (i.e. the one or the other reel has a greater diameter).

As will be seen from the free portion of tape will continuously be under tension independent of the diameter of the respective tape reel, and it should be observed that the tension of the tape on either side of the driving means 9, 10 is always alike. The ideal state for the tape transport or drive as mentioned in the preamble can thus be achieved by means of the present invention. The arrangement is very simple, since it does not require any supply or take-up motors for the tape reels. The force for both the tape transport and the supply and take-up of the tape comes from the driving means 9, 10, 11.

It should be noted that the shaft 13 of the differential gear with its planetary gear 17 rotates clockwise (seen from below) in the arrangement shown, as long as the tape reel 4 has a greater diameter than the tape reel 5, until the two reels have the same diameter, when the shaft 13 will stop and then start rotating counter-clockwise while the reel 5 is growing.

Owing to this fact the shaft 13 will rotate in a direction reducing the spring tension, if an initial tension has once been imparted to the spring 24 before loading the apparatus, for example by rotating the tape reel 5 in a direction contrary to that of the arrow above the reel in FIG. 1 while retaining the tape reel 4, until the tape reel diameters are equal, the shaft 13 then rotating in the opposite direction, so that the spring will be reset to the initial tension, when the tape is played through. By adjusting the spring in a suitable manner with regard to the number of revolutions of the shaft 13 to be expected in accordance with the respective reel diameter, the spring force, and hence the tension of the tape can be kept substantially constant during the whole playing through of a tape. In case long tapes with great reel diameters (the difference between an empty and a fully wound reel) are to be employed, it may be preferable between the spring 24 and the shaft 13 to insert a gear so that the shaft rotates several revolutions for the rotation of one revolution of the spring. In certain cases it may be preferable to attach the outer end of the spring in a spring housing, which can rotate about the shaft 13, this making it possible easily to set the initial tension of the spring by turning the spring housing after loading the apparatus with the tape, the spring housing then being locked against rotation. In case is should be required the rotation of the spring housing may be brought about mechanically, for example, by means of an electric motor. It may in this case be preferable to control the rotation of the motor with regard to the desired spring tension during the operation of the apparatus. It is naturally possible in such a case to replace the spring by a resilient coupling member. In order to indicate the spring tension preferably an indicator or hand is connected to the shaft 13, possibly via a gear.

Within the scope of the invention naturally such an embodiment may be taken into consideration, in which the differential gear is located on one of the shafts 2 or 3, the pivot 16 of the planetary gear 17 then being fixed onto a sleeve threaded over one of the said shafts, and the spring 24 being, for example, arranged concentrically about the differential gear and having its inner end fixed to the free end of the pivot 16 or connected to the same in any other way. The gear belts may be substituted by other transmission means, such as chains, bevel gearings or the like.

I claim:

1. A tape drive system for maintaining constant tension on a tape while driving the tape at a constant speed, comprising:

a base;

a supply reel and a take-up reel mounted on said base and adapted to have bodies of tape wound thereon;

a recording tape wound on said reels and adapted to be moved from one reel to the other reel;

capstan drive means mounted on said base for moving the tape at a constant speed;

toothed differential gear means having first and second sun wheels rotatable about a common axis;

a shaft coaxial with said common axis of said sun wheels and means supporting said shaft for independent rotation with respect to both of said sun wheels;

a planet wheel geared to said sun wheels and mounted on said shaft for movement with said shaft about said common axis;

first means drivingly connecting said first sun wheel with said supply reel to rotate said first sun wheel at the variable speed of said supply reel;

second means drivingly connecting said second sun wheel with said take-up reel to rotate said take-up reel at the variable speed of said second sun wheel; and torsion spring means connected with and acting on said shaft independently of said sun wheels so as to apply tension to the tape.

2. A tape drive system as claimed in claim 1 wherein the first and second means connecting the sun wheels to their respective tape reels include gear means.

References Cited

UNITED STATES PATENTS

| | | | |
|---|---|---|---|
| 2,657,871 | 11/1953 | Pettus | 242—55.14 |
| 2,954,939 | 10/1960 | Herrmann | 242—55.12 |
| 3,096,038 | 7/1963 | Fundingsland | 242—55.14 |
| 3,235,194 | 2/1966 | Willis | 242—55.14 |

FOREIGN PATENTS

| | | |
|---|---|---|
| 739,381 | 10/1955 | Great Britain. |

FRANK J. COHEN, *Primary Examiner.*

GEORGE F. MAUTZ, *Examiner.*